United States Patent
Pfeiffer et al.

(10) Patent No.: US 11,790,663 B2
(45) Date of Patent: Oct. 17, 2023

(54) FAST DETECTION OF SECONDARY OBJECTS THAT MAY INTERSECT THE TRAJECTORY OF A MOVING PRIMARY OBJECT

(71) Applicants: ROBERT BOSCH GMBH, Stuttgart (DE); PROPHESEE, Paris (FR)

(72) Inventors: Michael Pfeiffer, Böblingen (AT); Jochen Marx, Giesen (DE); Oliver Lange, Hemmingen (DE); Christoph Posch, Bad Fischau (AT); Xavier Lagorce, Saint-Maur-des-Fossés (FR); Spiros Nikolaidis, Paris (FR)

(73) Assignees: ROBERT BOSCH GMBH, Stuttgart-Feuerbach (DE); PROPHESEE SA, Paris (FR)

( * ) Notice: Subject to any disclaimer, the term of this patent is extended or adjusted under 35 U.S.C. 154(b) by 413 days.

(21) Appl. No.: 16/982,879

(22) PCT Filed: Mar. 19, 2019

(86) PCT No.: PCT/EP2019/056866
§ 371 (c)(1),
(2) Date: Sep. 21, 2020

(87) PCT Pub. No.: WO2019/180033
PCT Pub. Date: Sep. 26, 2019

(65) Prior Publication Data
US 2021/0056323 A1    Feb. 25, 2021

(30) Foreign Application Priority Data
Mar. 21, 2018 (EP) .................................... 18163096

(51) Int. Cl.
*G06K 9/00* (2022.01)
*G06V 20/58* (2022.01)
(Continued)

(52) U.S. Cl.
CPC ............. *G06V 20/58* (2022.01); *B60Q 9/008* (2013.01); *B60T 7/12* (2013.01); *B60W 30/09* (2013.01);
(Continued)

(58) Field of Classification Search
CPC ...................................................... G06V 20/58
See application file for complete search history.

(56) References Cited

U.S. PATENT DOCUMENTS

| 9,672,446 | B1 | 6/2017 | Vallespi-Gonzalez | |
| 2010/0289632 | A1* | 11/2010 | Seder ...................... | G06V 10/95 382/104 |

(Continued)

OTHER PUBLICATIONS

International Search Report for International Application No. PCT/EP2019/056866 dated Jun. 21, 2019.
(Continued)

*Primary Examiner* — Hadi Akhavannik
(74) *Attorney, Agent, or Firm* — Hunton Andrews Kurth LLP

(57) ABSTRACT

A system (1) for detecting dynamic secondary objects (55) that have a potential to intersect the trajectory (51) of a moving primary object (50), comprising a vision sensor (2) with a light-sensitive area (20) that comprises event-based pixels (21), so that a relative change in the light intensity impinging onto an event-based pixel (21) of the vision sensor (2) by at least a predetermined percentage causes the vision sensor (2) to emit an event (21a) associated with this event-based pixel (21), wherein the system (1) further comprises a discriminator module (3) that gets both the stream of events (21a) from the vision sensor (2) and information (52) about the heading and/or speed of the motion of the primary object (50) as inputs, and is configured to identify, from said stream of events (21a), based at least in part on said information (52), events (21b) that are likely to be
(Continued)

Figure 1:
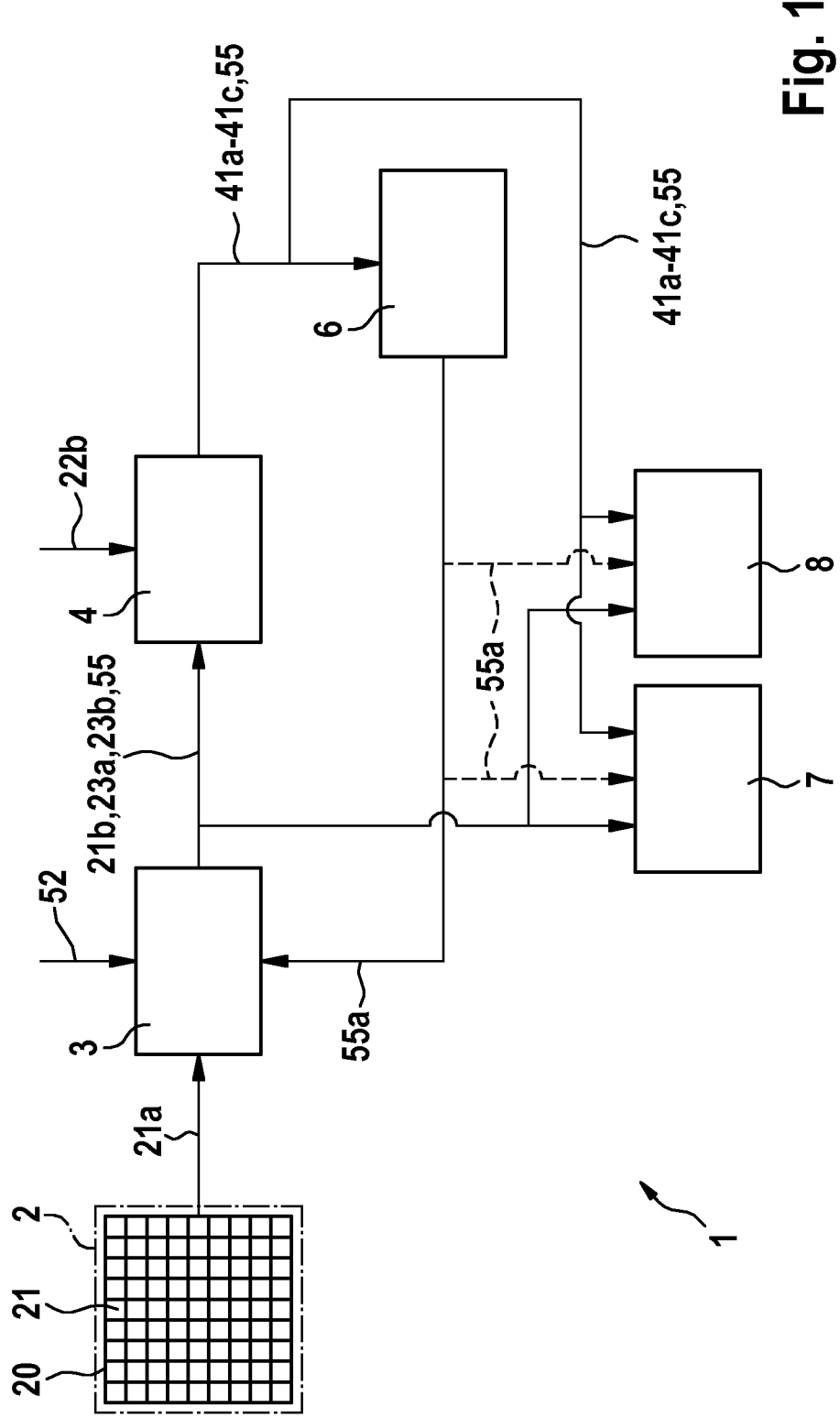

caused by the motion of a secondary object (55), rather than by the motion of the primary object (50).
Vision sensors (2) for use in the system (1).
A corresponding computer program.

10 Claims, 6 Drawing Sheets

(51) Int. Cl.

| | | |
|---|---|---|
| G06T 7/70 | (2017.01) | |
| B60Q 9/00 | (2006.01) | |
| B60T 7/12 | (2006.01) | |
| B60W 30/09 | (2012.01) | |
| B62D 15/02 | (2006.01) | |
| B64C 39/02 | (2023.01) | |
| G06N 3/04 | (2023.01) | |
| G06N 3/08 | (2023.01) | |
| G06T 7/20 | (2017.01) | |
| G08G 1/16 | (2006.01) | |
| G06V 20/10 | (2022.01) | |
| G06F 18/21 | (2023.01) | |
| G06F 18/24 | (2023.01) | |
| B60W 10/04 | (2006.01) | |
| B60W 10/18 | (2012.01) | |
| B60W 10/20 | (2006.01) | |
| G05D 1/02 | (2020.01) | |
| G05D 1/10 | (2006.01) | |

(52) U.S. Cl.
CPC ........ *B62D 15/0265* (2013.01); *B64C 39/024* (2013.01); *G06F 18/21* (2023.01); *G06F 18/24* (2023.01); *G06N 3/04* (2013.01); *G06N 3/08* (2013.01); *G06T 7/20* (2013.01); *G06T 7/70* (2017.01); *G06V 20/10* (2022.01); *G08G 1/166* (2013.01); *B60W 10/04* (2013.01); *B60W 10/18* (2013.01); *B60W 10/20* (2013.01); *B60W 2420/42* (2013.01); *B60W 2554/40* (2020.02); *B60W 2710/18* (2013.01); *B60W 2710/20* (2013.01); *B64U 2201/10* (2023.01); *G05D 1/0214* (2013.01); *G05D 1/0231* (2013.01); *G05D 1/101* (2013.01); *G06T 2207/20084* (2013.01); *G06T 2207/30241* (2013.01); *G06T 2207/30261* (2013.01)

(56) References Cited

U.S. PATENT DOCUMENTS

| | | | |
|---|---|---|---|
| 2017/0180336 A1* | 6/2017 | Josephson | G06F 21/32 |
| 2018/0218221 A1* | 8/2018 | Mosher | G06V 20/49 |
| 2019/0220002 A1* | 7/2019 | Huang | G06T 7/70 |

OTHER PUBLICATIONS

International Written Opinion for International Application No. PCT/EP2019/056866 dated Jun. 21, 2019.

Nicholas F.Y. Chen, "Pseudo-labels for Supervised Learning on Dynamic Vision Sensor Data, Applied to Object Detection under Ego-motion", Dec. 31, 2017.

Milde Moritz B et al, "Bioinspired event-driven collision avoidance algorithm based on optic flow", 2015 International Conference on Event-Based Control, Communication, and Signal Processing (EBCCSP), IEEE,Jun. 17, 2015 (Jun. 17, 2015), p. 1-7.

Amin Rigi et al, "A Novel Event-Based Incipient Slip Detection Using Dynamic Active-Pixel Vision Sensor (DAVIS)", SENSORS,vol. 18, No. 2, Jan. 24, 2018 (Jan. 24, 2018), p. 333.

Posch Christoph et al, "Retinomorphic Event-Based Vision Sensors: Bioinspired Cameras With Spiking Output", Oct. 31, 2014 (Oct. 31, 2014), vol. 102, No. 10, p. 1470-1484.

* cited by examiner

FAST DETECTION OF SECONDARY OBJECTS THAT MAY INTERSECT THE TRAJECTORY OF A MOVING PRIMARY OBJECT

CROSS REFERENCE TO RELATED APPLICATION(S)

This application relates to, and claims the benefit and priority from International Patent Application No. PCT/EP2019/056866 filed on Mar. 19, 2019 that published as International Patent Publication No. WO 2019/180033 on Sep. 26, 2019, which claims the benefit and priority from European Patent Application No. 18163096.3 filed on Mar. 21, 2018, the entire disclosures of which are incorporated herein by reference.

FIELD OF THE DISCLOSURE

The present invention relates to a system for detecting secondary objects that may collide with a moving primary object as early as possible, so that a warning may be issued or collision avoiding action may be taken.

BACKGROUND

An analysis of past road accidents has revealed that a large percentage of the accidents occurred because there was simply not enough time left for sufficient collision avoiding action. If there had been just a little more time, in many cases less than a second more, the accident could have been avoided.

To gain this crucial time, automatic emergency brake assistants have been developed. These assistants need a fast and reliable detection of objects with which a moving vehicle might collide. False positives are to be avoided because a needless emergency braking of the vehicle may come as a surprise to following drivers and cause a rear-end collision. But if the processing is more sophisticated, it may take too long.

Some time may be saved in the acquisition of visual information with a vision sensor. Conventional vision sensors output image frames. The detection speed obtainable using these sensors is a function of the rate of frames per second, and a function of the processing bandwidth that is available for handling the large flow of image data. US 2016/096 477 A1 suggests to augment a conventional vision sensor with event-based photosensing elements. Whenever the light intensity impinging on such an event-based photosensing element changes by more than a certain relative amount, the sensor immediately emits a corresponding event. There is no need to wait for the acquisition of the next image frame.

DISCLOSURE OF THE INVENTION

The inventors have developed a system for detecting dynamic secondary objects that have a potential to intersect the trajectory of a moving primary object. The moving primary object may, for example, be a manned or unmanned land or air vehicle, such as a normal passenger car, an at least partially self-driving car, a utility vehicle, a railway vehicle, an unmanned aerial vehicle ("drone"), a robot that roams around for performing work or surveillance, or an industry robot that is surrounded by a hazard area that is to be avoided by any personnel. The moving primary object may also, for example, be a device that is wearable by a human, such as a device that delivers an augmented reality to its user.

The system comprises a vision sensor with a light-sensitive area that comprises event-based pixels, so that a relative change in the light intensity impinging onto an event-based pixel of the vision sensor by at least a predetermined percentage causes the vision sensor to emit an event associated with this event-based pixel.

The system further comprises a discriminator module that gets both the stream of events from the vision sensor and information about the heading and/or speed of the motion of the primary object as inputs. Based at least in part on this information, the discriminator module is able to identify, from the stream of events, events that are likely to be caused by the motion of a secondary object, rather than by the motion of the primary object.

The information about the heading and/or speed of the motion of the primary object can be obtained in any appropriate manner. For example, in a vehicle, data from existing acceleration sensors that are used for other vehicle control systems may be accessed via a CAN bus or other bus. Also, speedometer information and the steering angle are accessible via such a bus as well. In a device that is wearable by a user, sensors such as tilt sensors, accelerometers, and GPS may be used.

The inventors have found that the motion of the primary object itself produces a large number of events. If there is a contrast-rich static object in the field of view of the vision sensor, by virtue of the motion of the primary object, this object will wander through this field of view and trigger a stream of events. But under normal circumstances, this static object will not intersect the trajectory of the primary object, i.e., a driver will not normally drive into such an object. Events caused by static objects are therefore not relevant for the task at hand, namely detecting objects that quickly and surprisingly enter the field of view. Identifying those events that are caused by the motion of a secondary object allows to safely disregard the large number of events caused by the motion of the primary object. The data transfer bandwidth and processing capabilities can then be focused onto the identified events that are the more important ones. Furthermore, the likelihood of false detections, which may result in unexpected emergency braking events, is reduced.

In a specially advantageous embodiment, the discriminator module is further configured to: in response to determining that there is a restricted region in the field of view of the vision sensor that gives rise to more than a predetermined number of events being emitted within a predetermined time frame, identify the events associated with this region as events that are caused by the motion of a secondary object. Because the motion of the primary object causes the whole field of view of the vision sensor to move, the events created by this motion will be more or less scattered across this field of view. By contrast, when an object unexpectedly enters the field of view, the corresponding events will be concentrated in a small region.

There may be a case where a strongly textured static object creates regions with high event activities, but such activity peaks remain in the field of view over a given period and move on a predictable trajectory, which distinguishes them from unexpectedly entering objects.

Specifically, in a further specially advantageous embodiment, the discriminator module is further configured to: in response to determining that the stream of events contains a sequence of events pertaining to locations in the field of view of the vision sensor that coherently move in at least one specific direction, wherein this specific direction is inconsistent with the motion of the primary object identify the events in the sequence as events that are caused by the motion of a secondary object. For example, if there are contrast-rich cars parked at a curbside, the motion of corresponding events through the field of view will be consistent with the motion of a car that serves as a primary object and is fitted with the system. But a pedestrian walking through the space between the parked cars and onto the road will produce a sequence of events that move in a direction perpendicular to the motion of the primary object.

In a further advantageous embodiment, the discriminator module is further configured to: compare the specific direction in which the events in the sequence move with the trajectory of the primary object, and identify the events in the sequence as events that are caused by the motion of a secondary object only if said specific direction intersects the trajectory of the primary object. For example, if a pedestrian just waves his arms while being stationary on the curbside, or walks from the road onto the pavement, then there is no danger that he will intersect the trajectory of the primary object on the road. Therefore, detection of this pedestrian does not warrant an emergency braking event.

In a further specially advantageous embodiment, the system further comprises a classifier module that is configured to classify, from the events that the discriminator module has identified as events that are caused by the motion of a secondary object, and/or from image information pertaining to a region in the field of view of the vision sensor that has given rise to said identified events, said secondary object into at least one of several categories. If the classifier module processes the events directly, then the selective culling of the events that are not caused by the motion of a secondary object greatly reduces the number of events to be processed. If the classifier module processes image information pertaining to a region associated with the events, then this region will be small compared with the size of the whole image of the whole field of view, so a lot less image information needs to be processed. Either way, the culling of less relevant information speeds up the classification and also reduces the risk of false classifications: what is not classified in the first place cannot be mis-classified. In a further specially advantageous embodiment, the classifier module comprises an artificial intelligence module, a computer vision module, and/or a statistical classifier module, that is trainable, and/or has been trained, using learning samples of input information and corresponding learning samples of desired classification results. For example, the artificial intelligence module may comprise a neural network. There is an advantageous separation of duties in the system: The discriminator module is solely responsible for detecting a "something" that moves in a potentially relevant manner, while the classifier module is solely responsible for determining what this "something" is. This means that an existing classifier module can be used without modifications: the classifier module can just be prepended by the discriminator module. Any modification to a trainable classifier module might entail an at least partial re-training of the module. Such training is typically time-consuming and expensive. For example, classifier modules used for classifying images as to which objects they contain may be trained with hundreds of thousands of training images and corresponding desired classification results. Also, the classifier module may already carry an official certification for use in public traffic, and any modification may invalidate this certification. With the present separation of duties, this problem can be avoided, and also the certification of the system as a whole (including the discriminator module) is facilitated.

Preferably, the artificial intelligence module comprises a spiking neural network that is configured to directly receive a stream of identified events as input. This further speeds up the classification because the stream of events may be sufficient for a classification already before the next image frame is delivered by the vision sensor. Also, the representation of a secondary object as a sequence of events may be a highly compressed data set compared with a representation as image information.

If the classifier module processes events as input, then it may, for example, process all events in a specific region over a specific time period. The events may be pre-processed to provide further information, e.g., optical flow, or may be processed over a given time to create a frame of average event activity.

If the classifier module processes image information as input, then the locations of the identified events may, for example, be translated into coordinates of a separate imaging sensor to obtain the image information corresponding to the events. Such translation may be saved if, for example, one and the same vision sensor comprises an interleaved mixture of image pixels that contribute to a conventional image and event-based pixels that immediately produce an event upon a sufficiently large relative intensity change.

In a driving assistance system, the job of the classifier module typically is to determine the exact nature of a secondary object that has been identified by the discriminator module as potentially dangerous. This comprises identifying secondary objects that are in fact not dangerous, e.g., irrelevant detections, or objects that will not do any harm when intersecting the trajectory of the primary object, such as water, snow, shadows, or falling leaves.

In a further specially advantageous embodiment, the classifier module is communicatively coupled to a tracker module that is configured to determine the position of the classified secondary object in the field of view of the vision sensor. Once objects are in the field of view of the vision sensor, they persist there for a given time. Instead of detecting and classifying them anew time and time again, it is economic to smoothly follow them over time, using the movement direction indicated by events inside and nearby the relevant region identified previously. Because events are generated at the moment where positions change, only small shifts need to be performed, rather than looking to find the same object in a new image frame. Tracking may also be applied to parts of the object (e.g., legs or arms of a pedestrian), rather than to the entire object.

The tracker module may be communicatively coupled to the discriminator module, and configured to feed back the position of the classified secondary object to the discriminator module. This permits re-using the information gained through the classifier module to fine-tune the initial culling of less relevant events. For example, if an object has been classified as not dangerous, then all subsequent events caused by further motion of this object may be culled. Also, if relevant objects are already being tracked, they do not come as a surprise to the discriminator module any more. For example, the processing of objects may be prioritized in a manner that new objects, which may have suddenly and unexpectedly entered the field of view of the vision sensor, are given top priority because these objects are most likely to collide with the primary object.

In a further specially advantageous embodiment, the system further comprises an alarm device that is configured to physically emit an alarm that is audible and/or visible to a user of the system in response to the presence of a secondary object being detected, and/or in response to a secondary object being classified into a predetermined category.

For example, an alarm may be sounded to alert a walking person or the driver of a vehicle to watch out for a new secondary object. In a head-up display or other device that delivers an augmented reality, a region in the field of view where a secondary object has been detected may be highlighted. If the secondary object has been classified, the result of such classification may be included in the alarm as well.

In a further specially advantageous embodiment, the system further comprises a mitigation module that is communicatively coupled to the power-train, to a braking system, and/or to a steering system, of a land or air vehicle serving as primary object. The mitigation module is configured to: in response to the presence of a secondary object being detected, and/or in response to a secondary object being classified into a predetermined category, actuate the power-train, the braking system, and/or the steering system, so as to avoid a collision of the vehicle that serves as primary object with the secondary object.

Such automatic response to the detection of secondary objects allows to cut the inevitable human reaction time out of the loop. At the same time, the response may be adequately matched to the concrete type of secondary object that has been detected. For example, it may not be desirable to cause the emergency braking of a car in response to detecting a small animal, so as not to risk causing a rear-end collision. But if the secondary object is a human, or a larger animal that may cause considerable damage to the vehicle upon collision, then it may be warranted to emergency brake the vehicle. Similar considerations apply to public transportation vehicles, such as buses or trains, where a sudden braking event or evasive maneuver may cause injury to standing passengers, and this has to be weighed against the danger of the potential collision.

When speaking of the "field of view" of the vision sensor, and of objects suddenly "entering" such field of view, these terms are not limited to the physical dimensions of an area from which light can in principle reach the vision sensor. Rather, the "field of view" has to be broadly interpreted as the area in which the vision sensor has a chance of detecting events or objects based on the current situation and conditions. For example, in the mentioned example of cars parked on a curbside and a pedestrian walking between those cars, an area that is obscured by a static object does not form part of the "field of view" in that situation because the vision sensor will not react to anything that happens in that area. Also, during nighttime, the "field of view" may be limited to those areas where sufficient lighting is available to register any events or objects. For example, when driving on a road that is not fitted with stationary lighting, the "field of view" is limited to the area lit by the vehicle's headlights, which in turn depends on whether low-beam or high-beam is currently in use. For example, in a case where the vehicle is initially on low-beam, and the driver later switches to high-beam in a situation where this does not glare an oncoming driver, the increased range of the high-beam may cause new objects to suddenly become visible, thus making them enter the field of view of the vision sensor at that moment.

The invention also provides a first embodiment of a vision sensor for use in the system described above. This vision sensor comprises a light-sensitive area that is divided into individual pixels, wherein each pixel is coupled to a detector that is configured to convert a light intensity, and/or a change in light intensity, into an electrical signal. A first nonzero fraction of the pixels is configured as event-based pixels, so that a relative change in the light intensity impinging onto an event-based pixel by at least a predetermined percentage causes the vision sensor to emit an event associated with this pixel. A second nonzero fraction of the pixels is configured as image pixels, so that the vision sensor provides an image composed from intensity values of the image pixels.

The ratio between the local density of event-based pixels and the local density of image pixels increases on a path from a central portion of the light-sensitive area to a boundary of said light-sensitive area.

The inventors have found that this optimally combines the advantages of both types of sensors specifically for navigating a vehicle or robot in land or air traffic. In most situations, the central area of the field of view, which corresponds to the central portion of the light-sensitive area, will contain objects that are already known to the system. Regarding these objects, it is desired to track how their behavior changes. Because no immediate danger is caused by the already known objects, it is more important to obtain accurate information than to obtain it at the maximum possible speed. In this respect, it is advantageous to have a higher density of image pixels in the central portion of the light-sensitive area. On the other hand, new objects that will suddenly and unexpectedly enter the field of view will very likely move across a boundary area of the field of view at some point. Therefore, it is advantageous to have more event-based pixels in a corresponding boundary portion of the light-sensitive area of the vision sensor. The event-based pixels will allow to register at least the presence of some object somewhere at the maximum possible speed.

Therefore, most preferably, the central portion of the light-sensitive area substantially comprises only image pixels, while at least one boundary portion adjacent to a boundary of the light-sensitive area substantially comprises only event-based pixels.

The central portion with substantially only image pixels may, for example, be adjacent to the border portion with substantially only event-based pixels, so that there is a sharp transition between the two. But the transition may also be gradual. The latter reduces artifacts that may arise from a sharp transition. In an area where both image pixels and event-based pixels are present, both types of pixels may be interleaved.

The invention also provides a second embodiment of the vision sensor. In this embodiment, compared with the first embodiment, in the light-sensitive area, event-based pixels are interleaved with image pixels in constant ratio. This brings about the advantage that both the acquisition of the events and the acquisition of images happen at exactly the same spatial resolution. In particular, if secondary objects are initially detected based on events their motion causes, but then classified based on image information from a region where these events have occurred, then no coordinate translation or scaling is required.

Some or all of the functionality of the system, and especially of the discriminator module, may be implemented in software. Also, a vision sensor may have individual pixels that may work either as event-based pixels or as image pixels, depending on how they are actuated. Therefore, the pattern according to which the event-based pixels and the image pixels are distributed in the light-sensitive area of the vision sensor may be implemented in software as well. For example, the software may be sold as an add-on, update or upgrade for an existing detection system. The invention therefore also relates to a computer program with machine-readable instructions that, when executed by a computer, and/or by a control unit, give the computer, and/or the control unit, the functionality of a system or a discriminator module provided by the invention, or cause the computer, and/or the control unit, to actuate a vision sensor in a manner that the vision sensor becomes a vision sensor provided by the invention. The invention also relates to a non-transitory storage medium or to a download product with the computer program.

In the following, further measures that further improve the invention will be explained in more detail in conjunction with the description of preferred embodiments of the invention using Figures.

PREFERRED EMBODIMENTS

Figure 2:
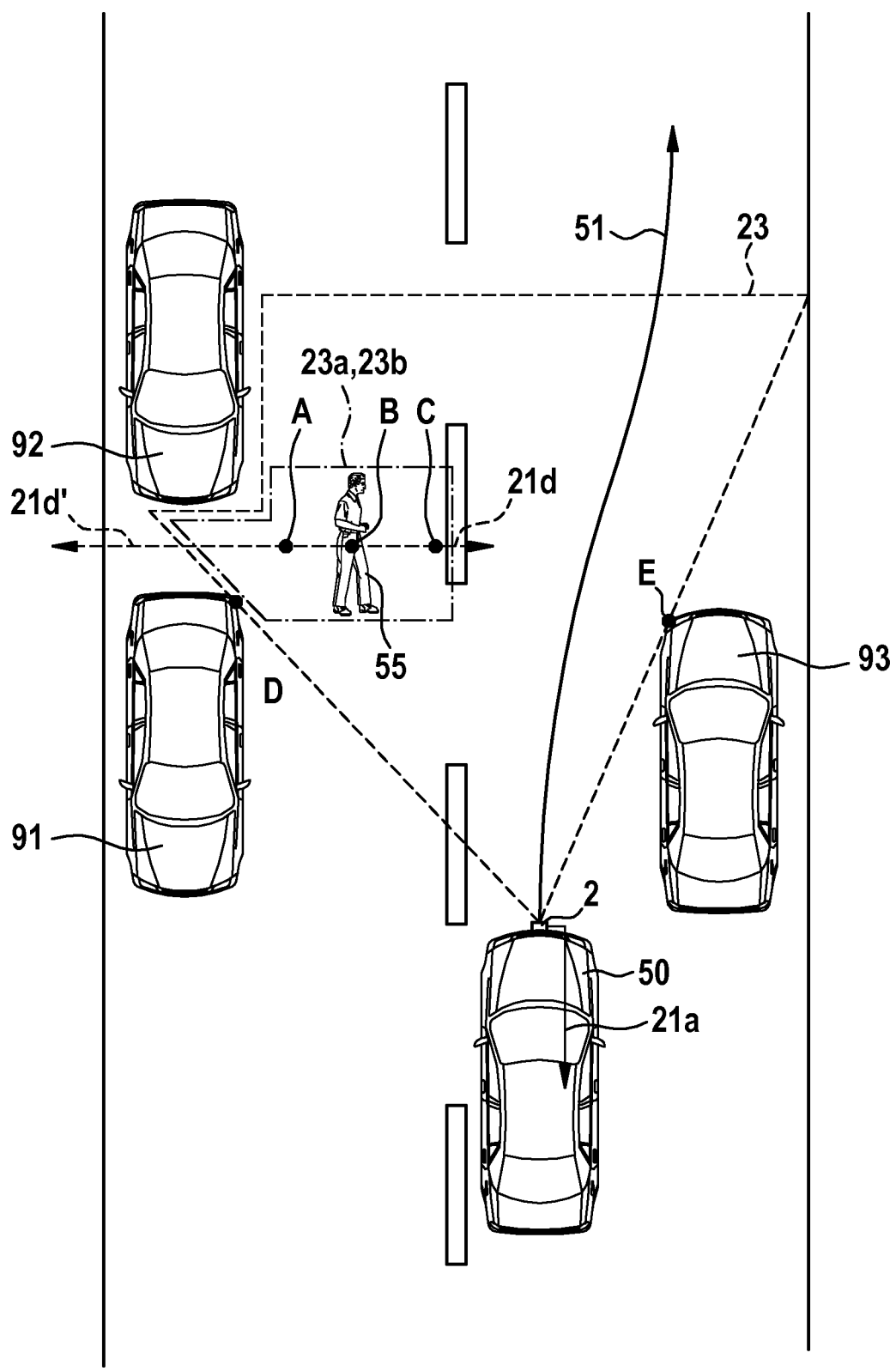
Figure 4:
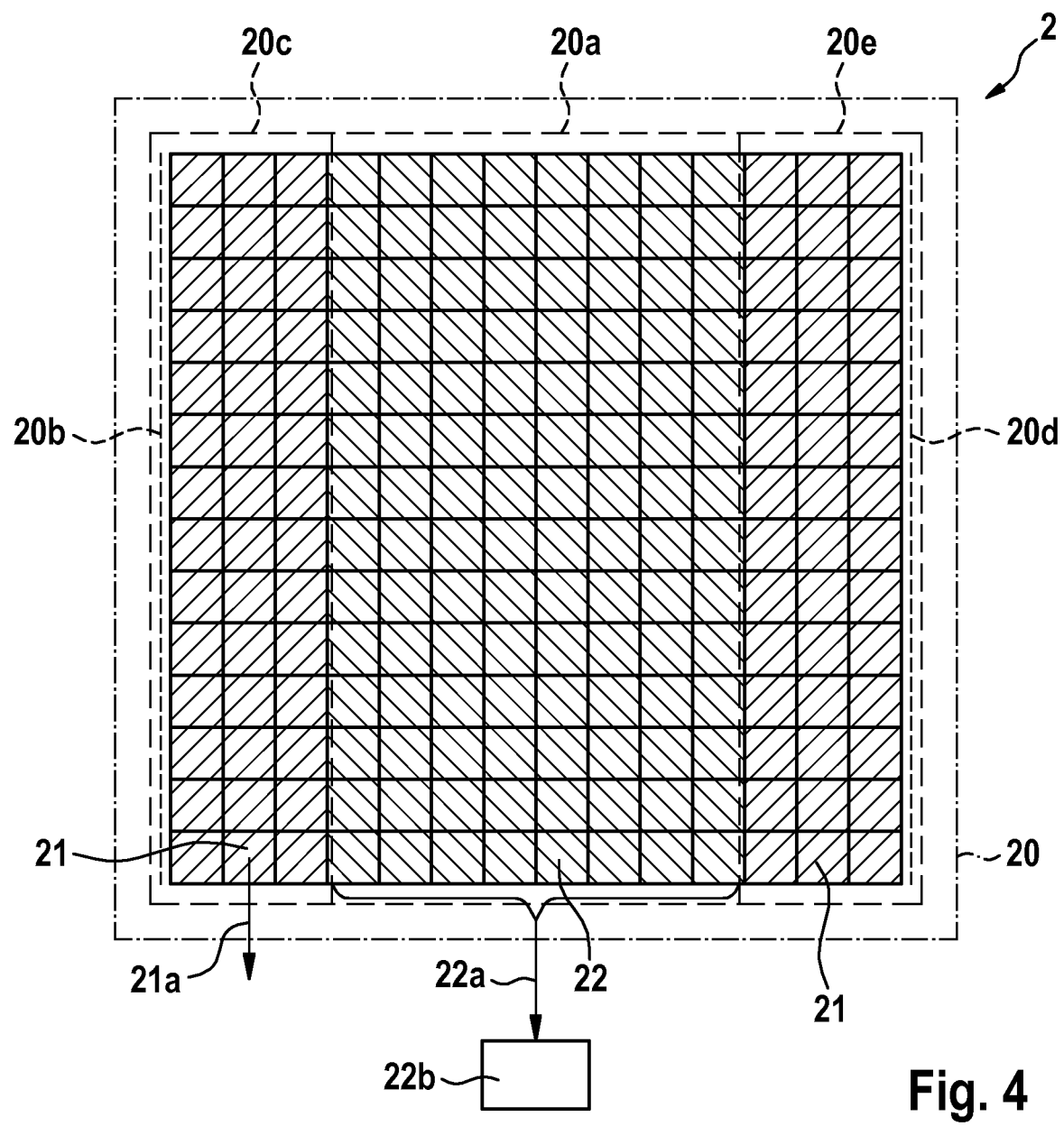
Figure 5:
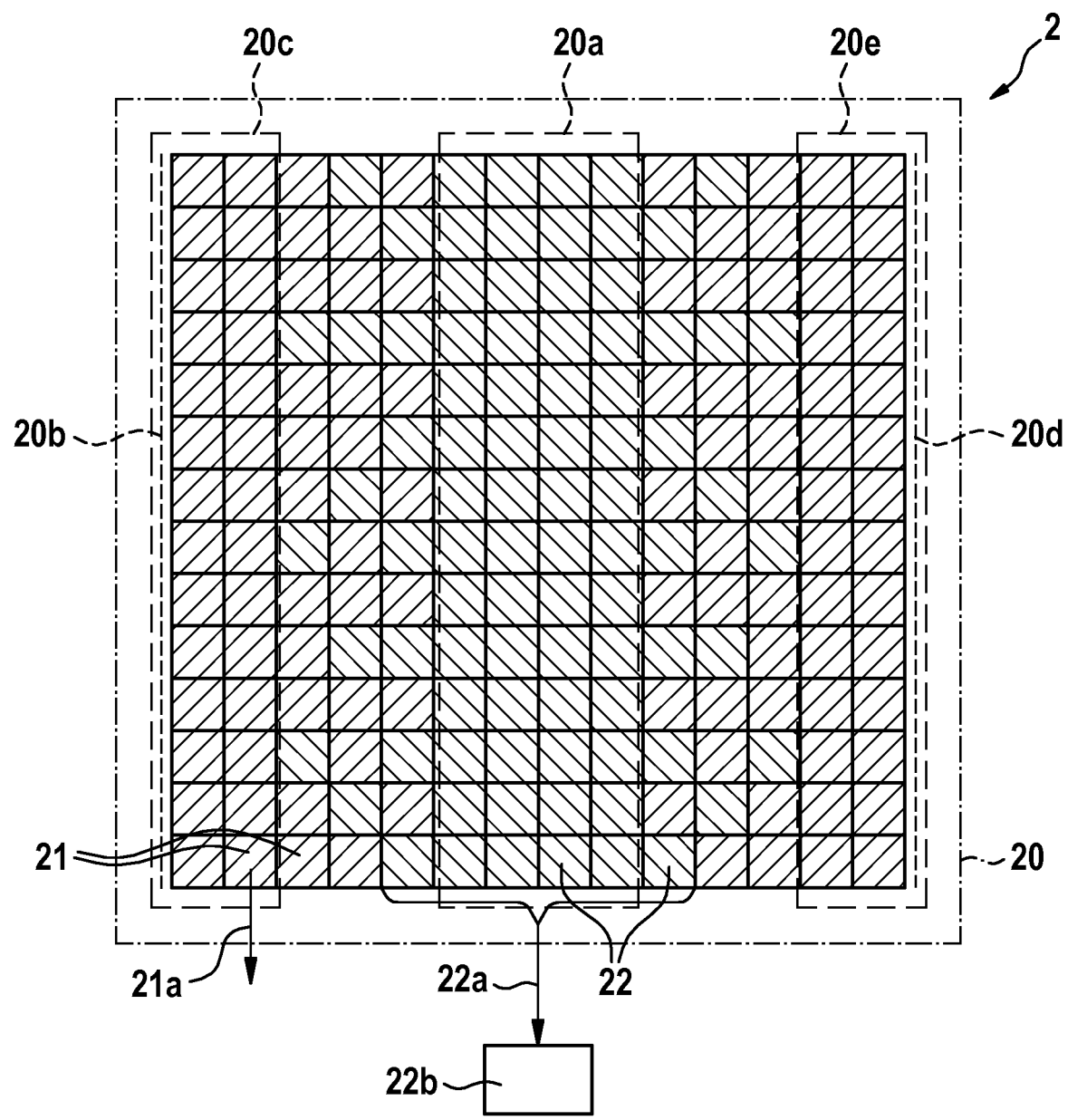
Figure 6:
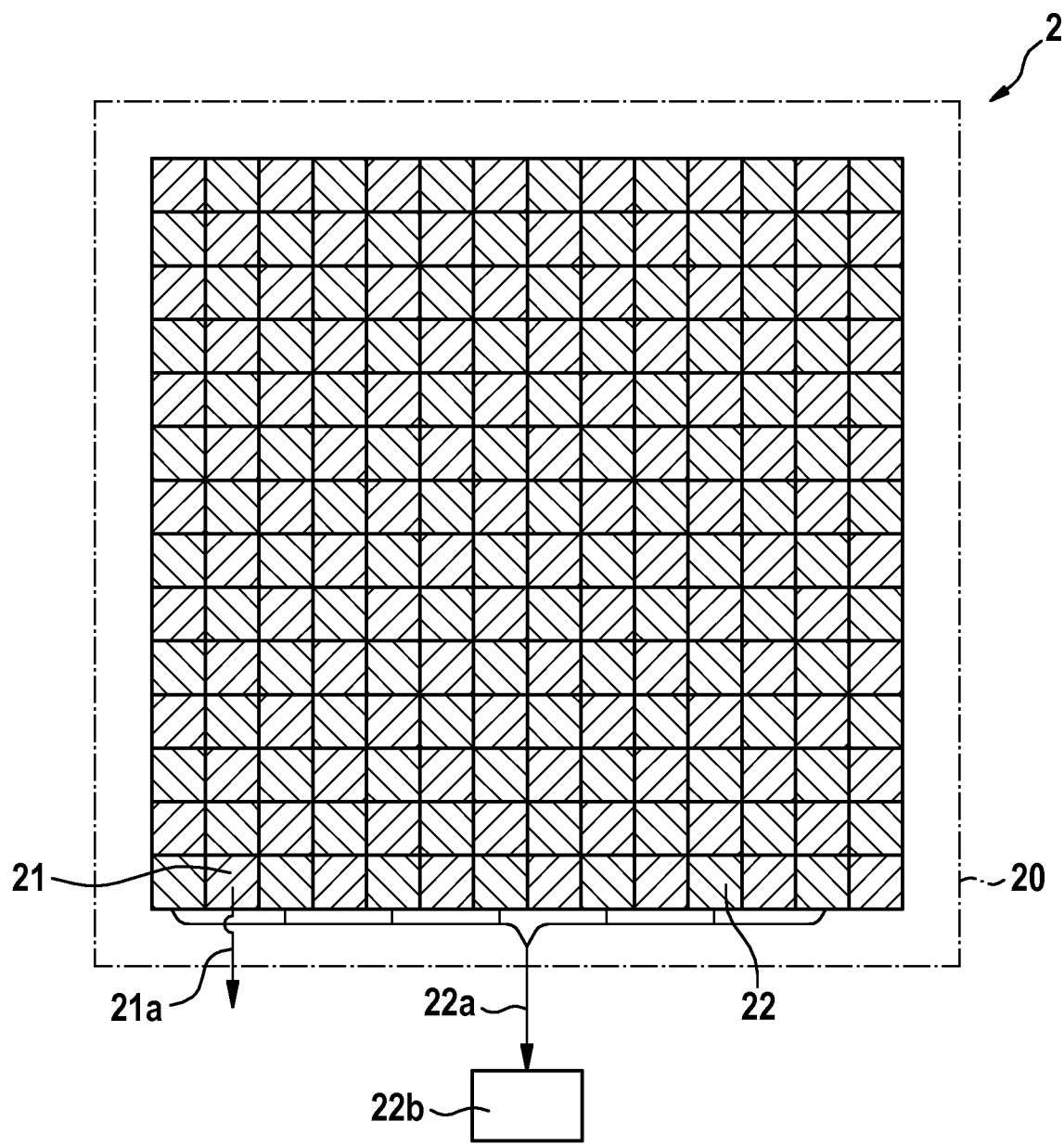

The Figures show:

FIG. 1 Exemplary embodiment of the system 1;

FIG. 2 Exemplary situation where secondary object 55 may intersect trajectory 51 of primary object 50;

FIG. 3 Establishing a sequence 21c of events 21b pertaining to the motion of secondary object 55;

FIG. 4 First embodiment of vision sensor 2 with sharp transition between central portion 20a and boundary portions 20c, 20e of light-sensitive area 20;

FIG. 5 Variant of first embodiment shown in FIG. 4, with gradual transition between central portion 20a and boundary portions 20c, 20e;

FIG. 6 Second embodiment of vision sensor 2 with event-based pixels 21 and image pixels 22 interleaved in a constant ratio.

FIG. 1 shows an exemplary embodiment of the system 1. Physical collection of measurement data is performed by vision sensor 2 that has a light-sensitive area 20, which in turn is divided into individual pixels 21. Whenever the light intensity impinging onto an event-based pixel changes at least by a certain percentage, the vision sensor 2 emits a corresponding event 21a.

The discriminator module 3 collects the events 21a from the vision sensor 2, as well as the information 52 about the heading and/or speed of the motion of the primary object 50. This information 52 may be acquired by any appropriate means, e.g., by means of dedicated sensors, or by accessing sensors that are already present somewhere in a vehicle via a bus system to which the sensors are connected (e.g., CAN bus).

The discriminator module 3 identifies those events 21b that are likely to be caused by the motion of a secondary object 55, as well as regions 23a, 23b within the field of vision 23 of the vision sensor 2 in which the events 21b occur. This information, optionally combined with corresponding image information 22b, is analyzed by the classifier module 4 to classify the secondary object 55 into at least one of several categories, here labeled 41a-41c. For example, category 41a may comprise secondary objects 55, such as humans, that have to be protected from a collision with primary object 50 no matter what. Category 41b may comprise secondary objects 55, such as small animals, that warrant a drastic collision avoidance action by primary object 50 only if this will not cause another accident. Category 41c may comprise secondary objects 55, such as rain or leaves, that may safely be run over by primary object 50.

Information about secondary objects 55 generated by one or both of the discriminator module 3 and the classifier module 4 may be fed into an alarm device 7 and/or into a mitigation module 8. Optionally, a tracker module 6 may determine positions 55a of already known secondary objects 55. The positions 55a may be forwarded to the discriminator module 3 to aid the ongoing detection, and/or to the alarm device 7 and/or to the mitigation module 8.

FIG. 2 shows a road scenario where the system 1 may detect a secondary object 55 earlier than a purely image-based vision system. A car serves as a primary object 50 and follows a trajectory 51 as steered by a driver, and/or by an electronic control unit. The trajectory 51 runs between parked cars 91, 92 and 93. Between parked cars 91 and 92, there is a small gap. A pedestrian that serves as the secondary object 55 in the scenario has just emerged from this small gap.

The primary object 50 carries a vision sensor 2 that has a field of vision 23. This field of vision 23 is partially obscured by parked cars 91 and 92. Whenever the light intensity somewhere in the field of vision 23 of the vision sensor 2 changes, events 21a are emitted by the vision sensor 2.

The secondary object 55 causes such events 21a to be fired for locations A, B and C within the field of view 23. Apart from that, contrast-rich features on the parked cars 91 and 93, together with the motion of primary object 50 along its trajectory 51, cause further such events 21a to be fired for locations D and E. Locations A, B and C lie in a region $23a=23b$.

FIG. 3 illustrates how a sequence 21c of events 21a that are caused by the motion of a secondary object 55 is established.

Figure 3A:
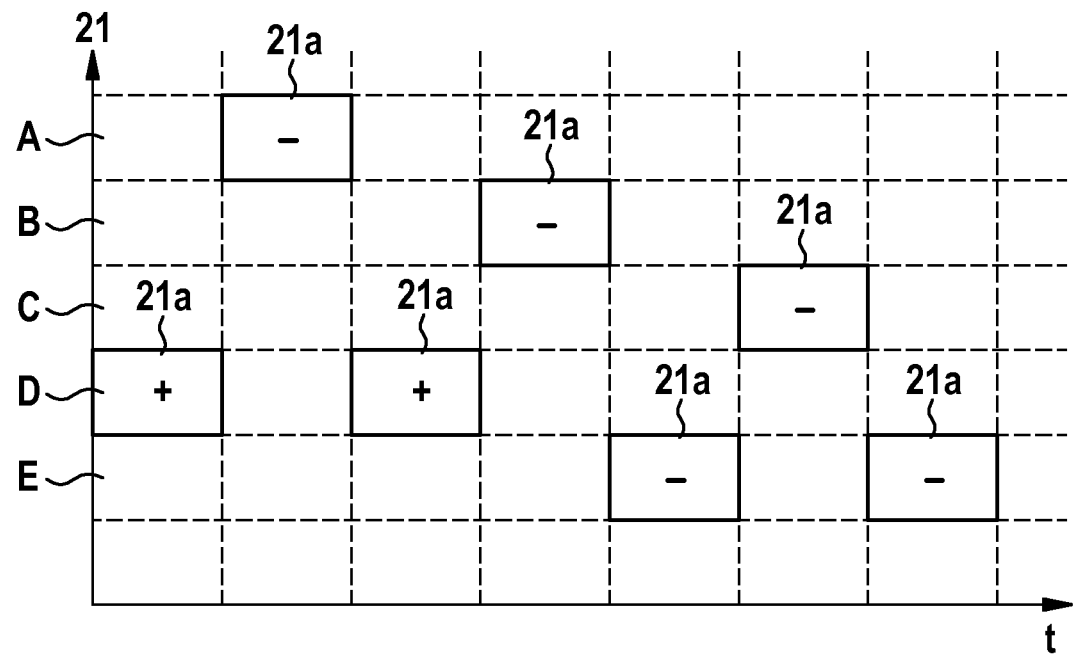

FIG. 3a shows the events 21a that are emitted when there are significant changes in the light intensity impinging on the event-based pixels 21 that correspond to locations A-E in the field of view 23. The locations A-E are shown in FIG. 2. The time t proceeds from left to right. When the light intensity increases by the predetermined percentage, an event 21a labelled "+" is emitted. When the light intensity decreases by the predetermined percentage, an event 21a labelled "−" is emitted. As it is shown exemplarily in FIG. 3a for the pixels 21 corresponding to locations D and E, when there is an ongoing change in light intensity by a larger total amount, a new event 21a will be emitted each time the relative change in the light intensity meets the predetermined percentage. Thus, one ongoing change in light intensity may give rise to two or more events 21a.

In principle, the stream of events emitted from each pixel 21 is accessible independently on the vision sensor 2. This means that simultaneously occurring events 21a from different pixels 21 may be read out and processed simultaneously. The stream of events 21a that is emitted by the vision sensor 2 as a whole may therefore comprise multiple events 21a for certain points in time.

Figure 3B:
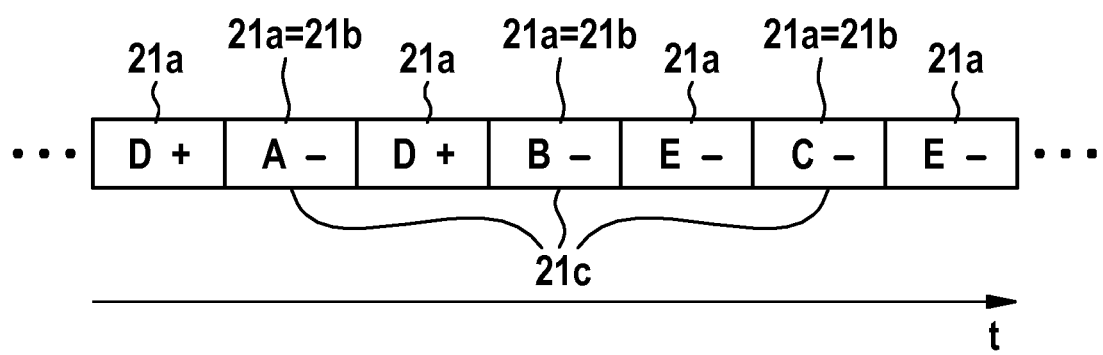

In FIG. 3b, the streams of events 21a pertaining to the individual pixels 21 have been combined into one single stream of events 21a that is emitted from the vision sensor 2 as a whole. In this example, there are no simultaneously occurring events, so the combined stream contains only one event for any given point in time. In FIG. 3b, each event is labelled with the location in the field of view to which it pertains, and also with "+" of "−" depending on whether it corresponds to an increase or a decrease in light intensity.

By means of the discriminator module 3, events pertaining to locations D and E, which are widely spaced apart and, upon motion of the primary object 50 along the trajectory 51, also move in a direction that is consistent with the trajectory 51 of the primary object 50, are culled. A sequence 21c of events 21b that are caused by motion of the secondary object 55 is thereby determined.

FIG. 4 shows a first embodiment of a vision sensor 2 that may be used in the system 1. The light-sensitive area 20 of the vision sensor 2 comprises a central portion 20a that contains only image pixels 22. This central area is surrounded by two boundary portions 20c and 20e that are adjacent to borders 20b and 20d of the light-sensitive area 20, respectively. The boundary portions 20c and 20e contain only event-based pixels 21.

Each individual event-based pixel 21 emits a corresponding event 21a when triggered by an appropriate change in light intensity. By contrast, intensity values 22a from all image pixels 22 are aggregated to form an image 22b. Immediate random-access to individual image pixels 22 is not possible; rather, one has to wait until the vision sensor 2 emits its next image frame 22b.

FIG. 5 shows a variant of the first embodiment of the vision sensor 2 shown in FIG. 4. The difference is that the transitions between the central portion 20a and the boundary portions 20c and 20e are gradual: Starting from the central portion 20a that contains only image pixels 22, with each column of pixels, the ratio with which event-based pixels 21 and image pixels 22 are interleaved shifts a bit more towards the event-based pixels 21.

FIG. 6 shows a second embodiment of the vision sensor 2. Akin to the first embodiment shown in FIGS. 4 and 5, there are event-based pixels 21 and image pixels 22. Each event-based pixel 21 emits its own events 21a when triggered, and those events 21a are immediately accessible. By contrast, a complete image 22b has to be downloaded from the vision sensor 2 to obtain the intensity values of individual image pixels 22.

Compared with the first embodiment, the difference is that the event-based pixels 21 and the image pixels 22 are interleaved in a constant ratio.

The invention claimed is:

1. A system for detecting at least one dynamic secondary object that has a potential to intersect a trajectory of a moving primary object, comprising:
    a vision sensor having a light-sensitive area that comprises event-based pixels which are configured such that a relative change in a light intensity impinging onto at least one of the event-based pixels by at least a predetermined percentage causes the vision sensor to emit at least one event associated with the at least one of the event-based pixels, wherein the primary object is a manned or unmanned land or air vehicle carrying the vision sensor, and the secondary object is the at least one dynamic object that is unexpectedly enters a field of view of the vision sensor; and
    a discriminator module configured to:
        receive (i) a stream of events from the vision sensor, and (b) at least one of a heading or a speed of a motion of the primary object as inputs, and
        identify, from the stream of events, based at least in part on said information, particular events that are likely to be caused by the motion of a secondary object, instead of by the motion of the primary object,
        in response to determining that there is a restricted region in the field of view of the vision sensor that gives rise to more than a predetermined number of the events being emitted within a predetermined time frame, identify further events associated with the restricted region as the particular events that are caused by the motion of the secondary object.

2. The system according to claim 1, wherein the discriminator module is further configured to, in response to determining whether the stream of events contains a sequence of events pertaining to locations in the field of view of the vision sensor that coherently move in at least one specific direction which is inconsistent with the motion of the primary object, identify the events in the sequence as the particular events that are caused by the motion of the at least one secondary object.

3. The system according to claim 2, wherein the discriminator module is further configured to (i) compare the specific direction with a trajectory of the primary object, and (ii) identify the events in the sequence as the particular events that are caused by the motion of the at least one secondary object only if the at least one specific direction intersects the trajectory of the primary object.

4. The system according to any one of claims 1, further comprising a classifier module configured to classify, from the events that the discriminator module has identified as the particular events that are caused by at least one of the motion of the at least one secondary object or from image information pertaining to a region in the field of view of the vision sensor that has given rise to the particular events, the at least one secondary object into at least one of particular categories.

5. The system according to claim 4, wherein the classifier module comprises a module which is at least one of (i) an artificial intelligence module, (ii) a computer vision module, or (ii) a statistical classifier module, wherein the module is trainable or has been trained using learning samples of input information and corresponding learning samples of desired classification results.

6. The system according to claim 5, wherein the artificial intelligence module comprises a spiking neural network that is configured to directly receive a stream of the particular events as input.

7. The system according to claim 4, wherein the classifier module is communicatively coupled to a tracker module that is configured to determine the position of the secondary object in the field of view of the vision sensor that is classified.

8. The system according to claim 7, wherein the tracker module is communicatively coupled to the discriminator module, and configured to feed back the position of the secondary object which is classified to the discriminator module.

9. The system according to claim 1, further comprising an alarm device configured to physically emit an alarm that is at least one audible or visible to a user of the system in response to at least one of (i) a presence of the at least one secondary object being detected, or (ii) a secondary object being classified into a predetermined category.

10. The system according to claim 1, further comprises a mitigation module (8) that is communicatively coupled to at least one of (i) a power-train, (ii) a braking system, or (iii) a steering system, of a land or air vehicle serving as the primary object, wherein the mitigation module is configured to: in response to the presence of (i) the at least one secondary object being detected, or (ii) the at least one secondary object being classified into a predetermined category, actuate at least one of the powertrain, the braking system, or the steering system, so as to avoid a collision of a vehicle that serves as the primary object with the at least one secondary object.

\* \* \* \* \*